Figure 9:
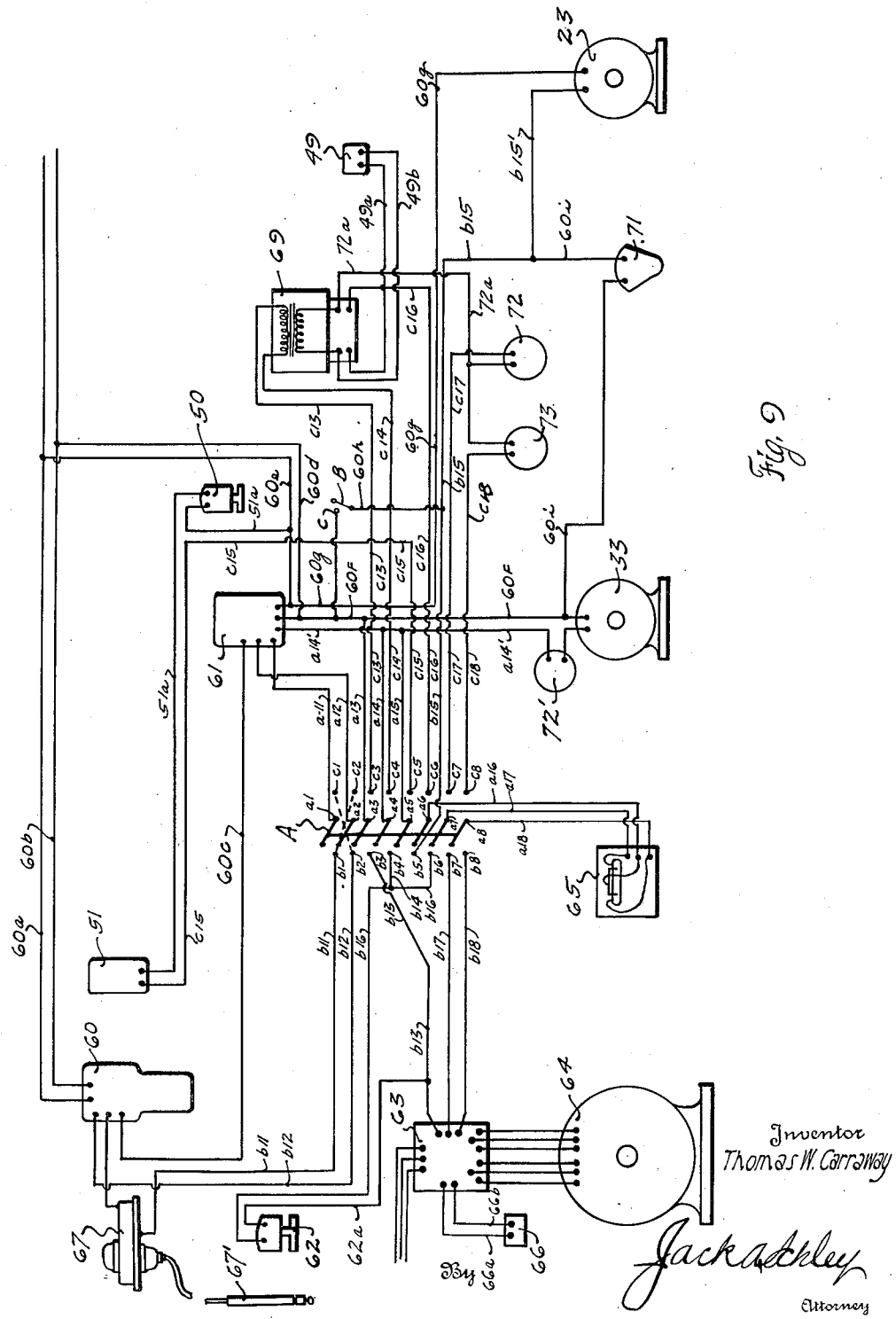

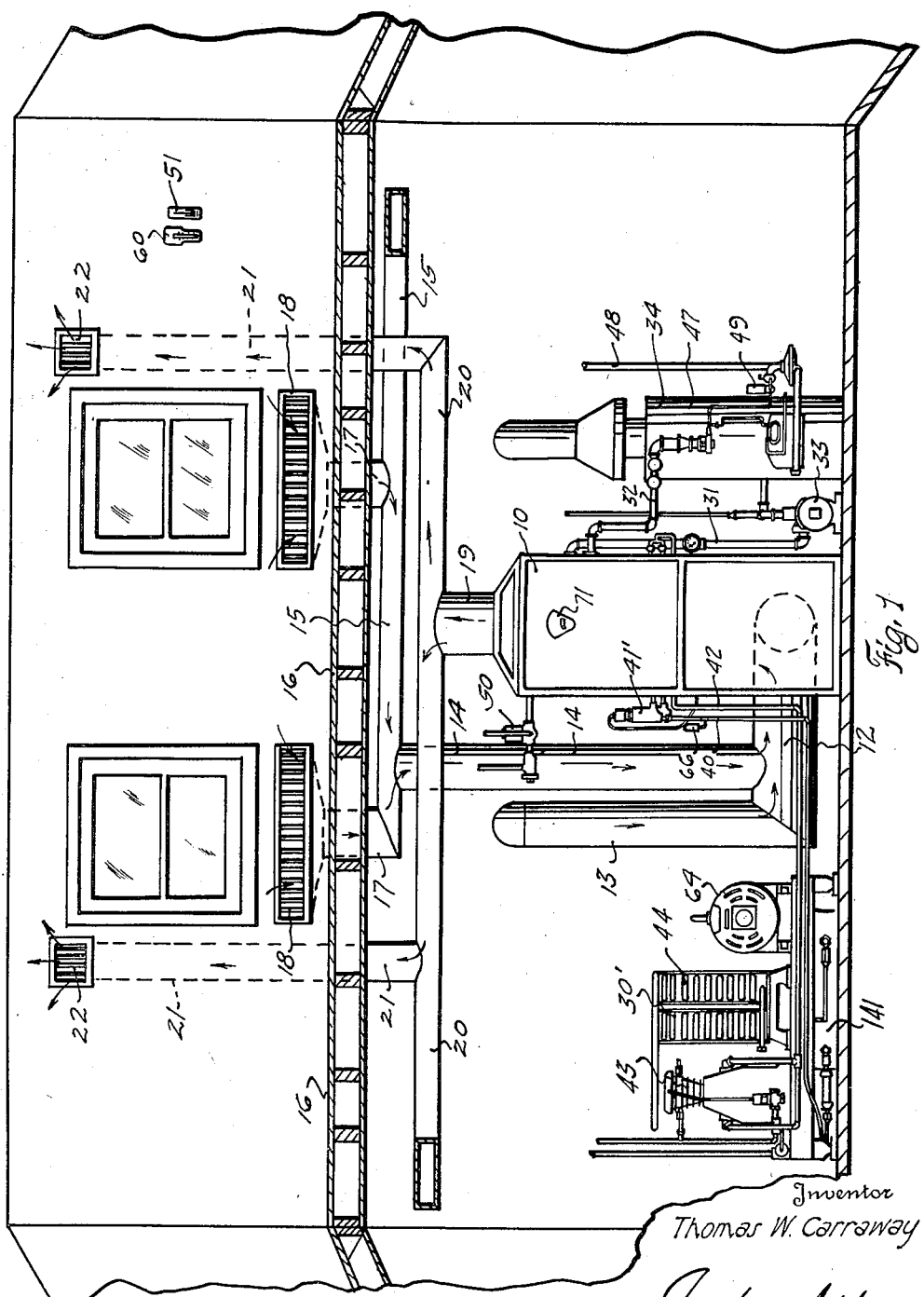

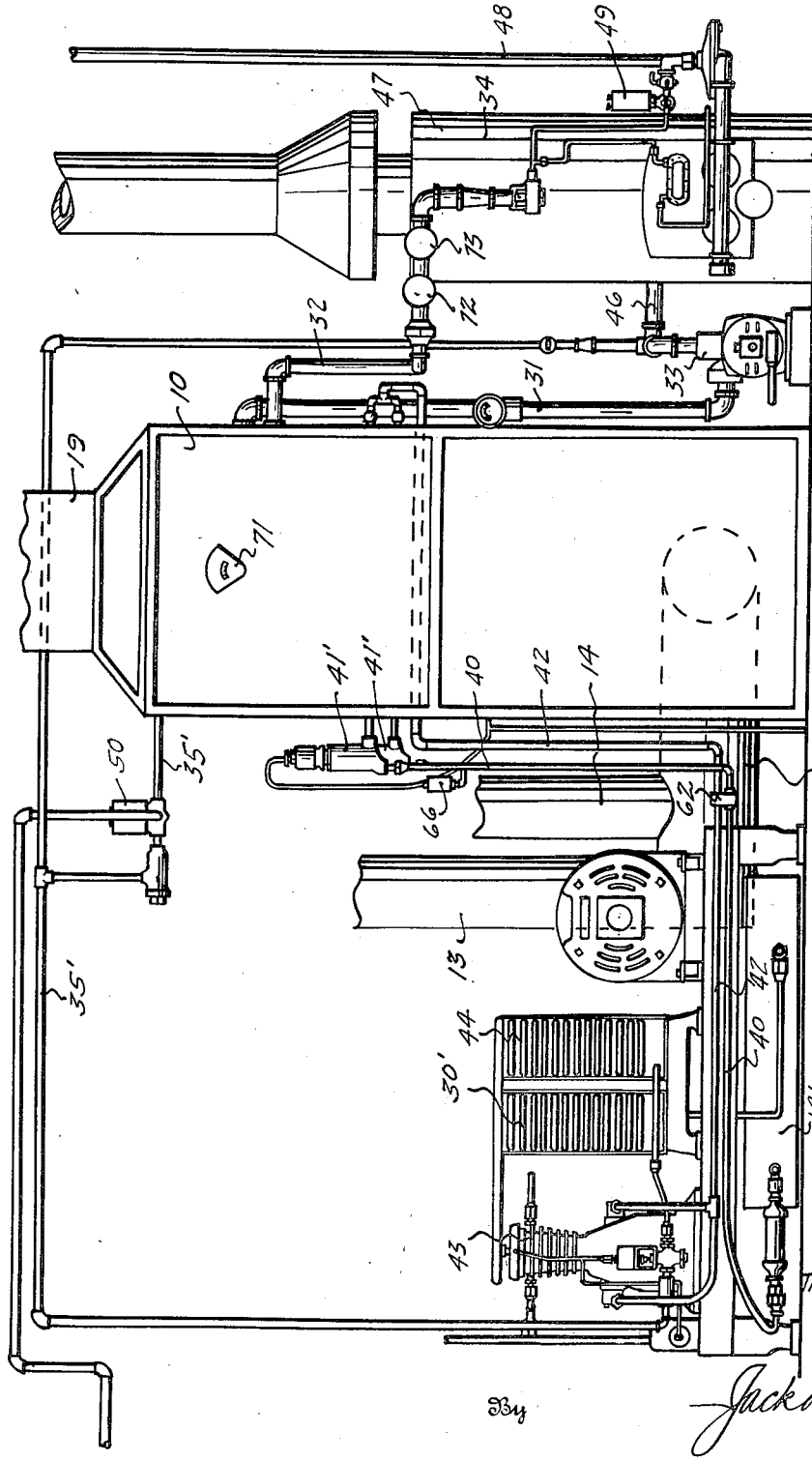

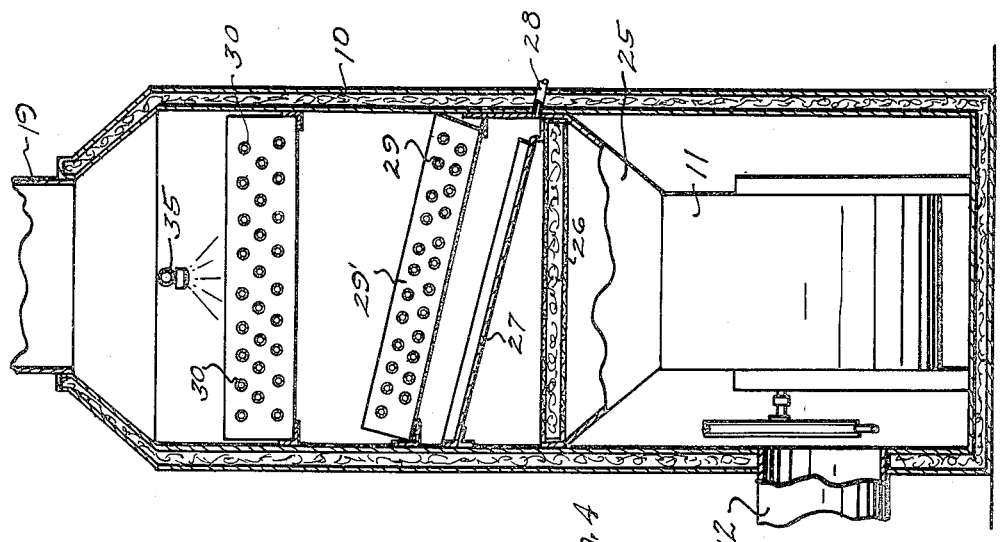
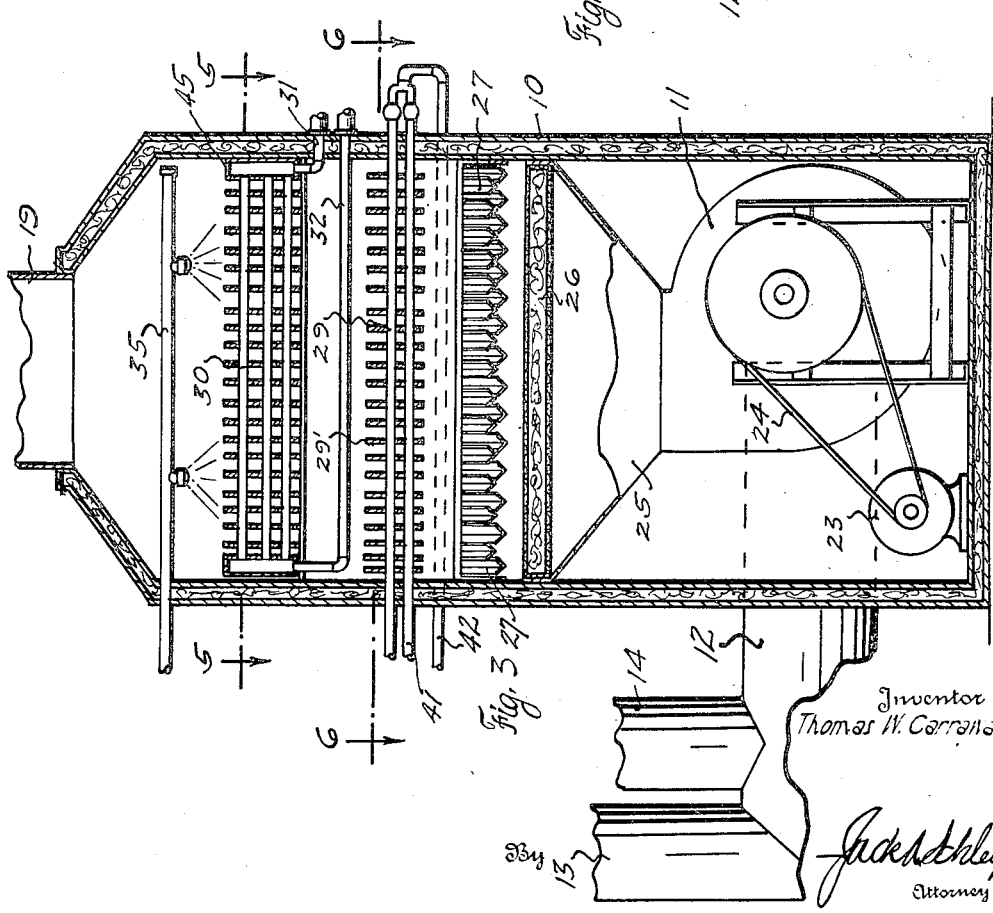

Aug. 24, 1937.  T. W. CARRAWAY  2,090,782
AIR CONDITIONING SYSTEM
Filed Aug. 27, 1934   5 Sheets-Sheet 4
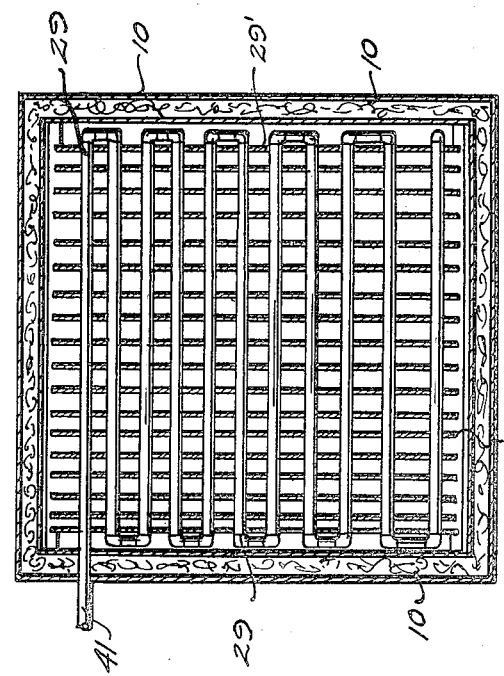
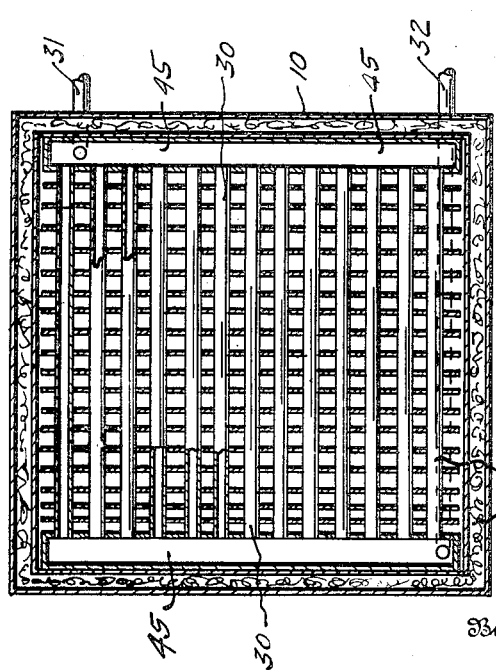
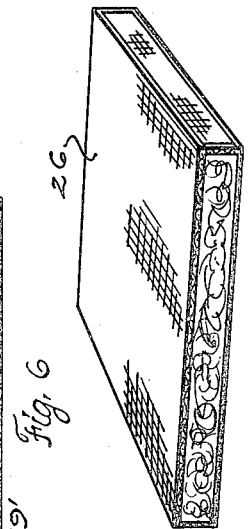
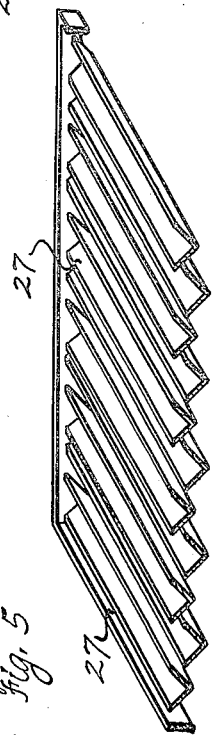
Inventor
Thomas W. Carraway
By Jack A. Ashley
Attorney Patented Aug. 24, 1937

2,090,782

UNITED STATES PATENT OFFICE 2,090,782

AIR CONDITIONING SYSTEM

Thomas W. Carraway, Dallas, Tex., assignor to Carraway Engineering Company, Inc., Dallas, Tex., a corporation of Delaware Application August 27, 1934, Serial No. 741,649

14 Claims. (Cl. 257—3)

This invention relates to new and useful improvements in air conditioning systems.

One object of the invention is to provide an improved air conditioning system involving such flexibility and controlling elements, that it may serve during all seasons of the year, thus becoming a year-round air conditioning system.

A particular object of the invention is to so arrange and balance the units of the system that they will operate at their highest efficiency under normal conditions and loads, thus making it necessary for the system to exceed its normal capacity, and probably at less efficiency, when subjected to abnormal conditions or peak loads. This is in contrast to the usual system which is designed to operate at its highest efficiency under peak loads and therefore requiring it to work at less efficiency under normal loads or conditions.

Another object of the invention is to provide an improved year-round air conditioning system providing for ventilating, cleaning, cooling, heating, dehumidifying, and moistening of circulated air when necessary.

A further object of the invention is to provide in the area or room to be conditioned, means for automatically controlling the condition of the air circulated therein, particularly providing for operation under normal conditions and loads, as well as automatically controlling the units for peak or abnormal loads; and also when heated air is being supplied, controlling the humidity thereof.

Still another object of the invention is to provide a system which will be very simple in its control, involving the manipulation of one electrical switch member to change over from air cooling to air heating operations, and including a separate control for the air circulating means, whereby both the air heating and air cooling may be cut out and merely the circulation of air, mixed with fresh outside air, maintained, thus making a system adaptable to any desired air condition.

A further object of the invention is to provide an improved system including an air conditioning unit, wherein separate coils for heating and cooling are provided, thereby eliminating the necessity of employing a single coil for both the heating and cooling operations, and providing for more efficient operation.

A still further object of the invention is to provide an improved air conditioning system including a pair of automatically operated temperature control members which coact with each other; one of the members being exposed to and actuated by the temperature of the air within the area to be conditioned, while the other member is exposed to and actuated by the temperature outside the area to be conditioned, the members being so connected that a temperature difference is maintained between the area to be conditioned and the outside, whereby an evenly regulated temperature is produced within the area to be conditioned.

A construction designed to carry out the invention will be hereinafter described, together with other features of the invention.

The invention will be more readily understood from a reading of the following specification and by reference to the accompanying drawings, in which an example of the invention is shown, and wherein:

Figure 1 is a vertical sectional view of a portion of a building showing an air conditioning system constructed in accordance with the invention installed therein, Figure 2 is a view showing cooling, heating and air conditioning elements, Figure 3 is a transverse vertical sectional view of the air conditioning unit, Figure 4 is a view similar to Figure 3, taken at right angles thereto, Figure 5 is a horizontal cross-sectional view taken on the line 5—5 of Figure 3, Figure 6 is a horizontal cross-sectional view taken on the line 6—6 of Figure 3, Figure 7 is a detail of the drip trough, Figure 8 is a detail of the filter, and Figure 9 is a diagrammatical view of the electrical equipment and wiring.

In the drawings the numeral 10 designates the air conditioning unit of the improved system. As is shown in Figs. 3 and 4, this unit includes an air impeller or blower 11, having an intake flue 12. This flue extends horizontally through the lower side wall of the unit and is connected with a make-up or air supply duct 13 connected with the outside of the building for supplying fresh air. The flue 12 is also connected with the return duct 14 of the air circulating conduit. In Fig. 1 the duct 14 is connected with a manifold flue 15 located below the floor 16. In this view the units are shown as located in a basement, cellar or other place below the floor of the building.

Short return flues 17 extending through the floor are connected with the manifold flue 15. These flues 17 lead from return grilles 18 located in the side wall of the room just above the floor. A discharge flue 19 extends from the top of the unit 10 to a manifold duct 20. Risers 21 extend from the duct 20 up through the floor 16 to grilles 22 located in the side wall of the room near the ceiling thereof.

It will be seen that when the blower 11 is operating, air will be drawn through the flue 12 from the outside air flue 13 and air will also be drawn from the room through the grilles 18 and conductors 17, 15 and 14 to said flue. This air will be discharged from the blower 11 into the conditioning unit 10 and in passing through this unit, such air will be conditioned according to the summer or winter operation of said unit and will be discharged through the flue 19 at the upper end thereof. This air will be delivered to the duct 20 and thence to the risers 21, finally being discharged through the grilles 22 into the upper portion of the room.

This air will again be recirculated, being drawn in through the grilles 18 and carried through the unit 10. It is much more economical to recirculate a large portion of the inside air than to supply outside air for the entire operation. Sufficient outside air is supplied to vitalize the recirculated air. The parts which have been described are subject to variations and have been set forth merely as an explanation of the system.

The air conditioning unit 10 has its walls suitably insulated, as is common in this art. The blower 11 is located in the lower portion of the unit and is driven by an electric motor 23 by means of a belt 24. The blower discharges the air into the air conditioning chamber above through an interposed horizontal filter 26 which is shown in detail in Fig. 8. This filter is purchased in the open market and is especially adapted for air conditioning use. It contains fibrous material and its purpose is to clean the air which is discharged from the blower. As is best shown in Figs. 3 and 4, an inclined drip trough 27 is located above the filter and has a discharge pipe 28 leading through the wall of the unit to a suitable point of discharge. Air cooling or evaporator coils 29 are located above the drip trough. These coils are connected in the usual manner with a condensing unit 30' including a compressor 43 which preferably is driven by an electric motor 64 as will be hereinafter set forth although other forms of prime mover driving means subject to control in their operation may be substituted for the electric motor.

Above the cooling coils, heating coils 30 are located. These coils 30 are connected by an inlet pipe 31 and a return pipe 32, respectively with a pump 33 and a furnace 34, as will be hereinafter described. Just above the coils 30 is located a spray head 35.

For the best results, the system is arranged so that the blower may be independently operated and the cooling coils 29 and the heating coils 30 also independently operated.

One of the very important features of this invention is that the conditioning unit 10 is balanced with the condensing unit 30' and the heating unit 34 so that the coils 29 and 30 will operate at their highest efficiency under normal loads. As an illustration, it will be assumed that the system is designed to produce in the room wherein the air is to be cooled, a temperature of 80° F. when the outside temperature is 95 degrees F. The compressor 43 of the condensing unit 30' would thus run continuously to produce this result. Should there be a temperature increase, a controlling mechanism exposed and actuated by the outside temperature for the condensing unit will be actuated. Should the temperature rise above 95 degrees, then this would necessitate the speeding up of the compressor and an increase in the capacity of the cooling system, due to the peak load condition. As this is only a temporary condition, the apparatus is designed so that it will take care of such an emergency. Although caring for this emergency will sacrifice the maximum efficiency of the machine, its highest efficiency may be maintained when it is working under normal temperatures and conditions. The same theory is carried out with the heating unit.

It is obvious that such an arrangement will be more economical and will be much less expensive to build and to install, as well as maintain. By providing automatic controls in the room or area where the air is to be conditioned, and also in the zone outside this area to take care of the normal and abnormal operation of the units, manual manipulation and control is thus eliminated and the system becomes entirely automatic, and a temperature difference is maintained between the outside area and the conditioned area. Under some conditions it is desirable to manually select the particular operation desired. For instance, for spring and fall operations and possibly during some summer evenings, it would be desirable to cut out both the heating and cooling units and merely operate the blower 11 to circulate air in the room. It would be possible to close off the grilles 18 and merely supply fresh air to the room. During the winter it would be possible to cut out the blower and not circulate the air, although this is not recommended.

The air cooling or evaporator coils 29 are supported in fins 29' which extend transversely in the unit 10, and are connected through an inlet pipe 40 (Figs. 1 and 2) with a reservoir or receiver 141 of the condensing unit 30'. The refrigerant, such as freon, is introduced into these coils and is hermetically sealed therein, although this is not essential. An outlet pipe 42 leads from the coils to a compressor 43 of the unit. From the compressor 43 of the unit, the refrigerant is conducted through condensing coils 44, where the heat is extracted, to the receiver 141. From the receiver, the refrigerant is circulated back through the evaporator coils 29 through the pipes 40. Thus, it will be seen that circulation of the refrigerant through the evaporator coils 29 is maintained.

When the refrigerating unit is operating, the liquid refrigerant, which is under pressure, flows from the receiver through the pipes 41 to separate coils 29. The refrigerant flows through expansion valves 41' which are positioned between the pipes and the coils, so that just before entering said coils, the pressure of the refrigerant is reduced, and this causes said refrigerant to be reduced to a gas within the evaporator coils. As the air within the unit 10 is forced upwardly by the blower 11, contacting the two evaporator coils successively latent and sensible heat will be extracted therefrom and the temperature lowered to successively de-humidify the air to the required degree. The gaseous refrigerant then passes from the evaporator coils 29 to the compressor 43'.

From the compressor, the gaseous refrigerant under pressure is conducted into the condensing coils 44, whereby it is cooled and condensed to its liquid form, and then in its liquid form it is returned to the reservoir from where it is again circulated through the evaporator coils 29. It is obvious that so long as the condensing unit is operating, a circulation of the refrigerant controlled by expansion valves 41' through the coils 29 is maintained. The condensing unit 30' is connected with the automatic controls, which are positioned within the area and also outside the area to be conditioned, whereby the unit is automatically controlled by the temperature, as will be hereinafter explained.

When using the heating unit 34, the refrigerating unit 30' is dormant and the refrigerant is idle in the system. Since a separate set of coils 30 is employed in the heating of the air passing through the conditioning unit 10, it is unnecessary to drain the evaporator coils 29 during the winter months when the condensing unit is idle.

The heating coils 30 are connected to headers 45 which are secured to the sides of the cabinet, whereby the coils 30 extend transversely of the conditioning unit 10. Transverse fins positioned at right angles to the coils are mounted between the headers. One of the headers is connected through the inlet pipe 31 to the circulating pump 33 which is connected through a short pipe 46 with a heater 47 of the heating unit. The return pipe 32 leads from the other header directly to the heater, whereby a circulation of the water through the coils 30 and heater 47 may be maintained. I have shown the heater as fired by a gas supply line 48 having a magnetic control valve 49 connected therein. This valve controls the operation of the boiler and is connected in the same electrical circuit as the pump 33 although the boiler may be controlled separately which is preferable, whereby circulation is started when the boiler is operated, as will be hereinafter explained. It will be seen that when the boiler is operating, hot water is circulated through the coils 30 and air, passing upwardly through the conditioning unit, is heated.

It has been found in some cases that when the air is heated, the air at high temperature will support a greater moisture content than at low temperature and it is sometimes necessary to introduce water into the heated air to properly condition this air which is released into the conditioned area through the grilles 22. For this purpose, the spray head 35 is provided. This head is suitably connected to a water supply line 35' in which a magnetic valve 50 is positioned. This valve is electrically connected with a hygrostat 51 in the area to be conditioned. When the humidity of the room drops below a pre-determined point, the hygrostat will open the valve 50 and admit water to the spray head, whereby water is sprayed directly into the air stream passing upwardly through the unit 10, and its humidity is thus increased.

The three units, refrigerating, heating and air conditioning are so connected that it is possible to operate either the refrigerating unit with the air conditioning unit for summer operation; the heating unit with the air conditioning unit for winter operation, or the air conditioning unit by itself for spring and fall operation. In Fig. 9, I have shown a complete wiring diagram of the automatic controls.

A master control switch, A, which is shown as a double throw, 8 pole switch of the conventional type, controls the operation of all the units. The switch includes contacts $a1$, $a2$, $a3$, $a4$, $a5$, $a6$, $a7$ and $a8$ which have lead wires $a-11$, $a12$, $a13$, $a14$, $a15$, $a16$, $a17$ and $a18$ respectively leading therefrom. When this switch is thrown to the left (Fig. 9) it engages contacts $b1$, $b2$, $b3$, $b4$, $b5$, $b6$, $b7$ and $b8$, which closes the circuit to the condensing unit 30' and air conditioning unit 10 for summer operation, as will be hereinafter explained. These contacts have lead wires $b-11$, $b12$, $b13$, $b14$, $b15$, $b16$, $b17$ and $b18$ respectively leading therefrom. When the switch A is thrown to the right (Fig. 9) it will engage contacts $c1$, $c2$, $c3$, $c4$, $c5$, $c6$, $c7$ and $c8$, which will close the circuit to the heating unit 34 and conditioning unit 10 for winter operation, as will be explained later. The contacts $c3$ to $c8$ have wires $c13$, $c14$, $c15$, $c16$, $c17$ and $c18$ respectively, leading therefrom. It is pointed out that the contact $b1$ is connected to the contact $c2$ and the contact $b2$ is connected to the contact $c1$. For spring and fall operation, the switch A is in a neutral position and the blower 11 is energized from the source of supply by engaging a switch B with a contact C, which will operate only the blower, as will be hereinafter brought out.

Assuming that it is desired to operate the unit in the summer, the switch A is thrown to the left (Fig. 9) so that said switch engages the contacts $b1$ to $b8$. An electric thermostat 60 is positioned in the area to be conditioned, whereby the temperature within the area is held constant. The thermostat is connected to the wires $b-11$ and $b12$ which lead from the contacts $b1$ and $b2$. The wire $b-11$ is for summer operation of the thermostat and the wire $b12$ is for winter operation. Electrical current is supplied to the thermostat by supply wires $60a$ and $60b$ and a connection $60c$ leads from the thermostat directly to one side of a relay switch 61 of the conventional type.

When the switch A is thrown to the left (Fig. 9) it engages the contacts $b1$ to $b8$. Its engagement with the contact $b1$ closes the electrical circuit to the other side of the relay 61 through the wires $b-11$ and $a12$. This action operates the relay switch and establishes electrical contact between an electrical supply wire $60e$ and a wire $a14'$ which connects to the wire $a14$, leading from the switch contact $a4$, which is connected through the switch with the contact $b4$. Thus, the electric current is conducted from the contact $b4$ through wire $b14$ which ties into the wire $b16$ leading from the contact $b6$. Thus, it is seen one side of the electrical current is conducted to the contact $b6$. The wire $b14$ leads to a magnetic valve 62 which is positioned in the refrigerant line 40 to control the passage of the refrigerant therethrough. This valve is of a conventional type and is opened by the electrical current. The current then passes through the valve and through a wire $62a$ to the wire $b13$ which leads from the contact $b3$ to a two speed motor control 63 of the condensing unit motor 64.

The contact $b3$ is, of course, connected through the switch A with the contact $a3$ and wire $a13$. The wire $a13$ is directly connected to a wire $60f$ which leads from the other side of the electrical circuit which is the wire $60d$. Thus, it is obvious that one side of the motor control 63 is directly supplied from the wire $60d$, through the contacts $a3$ and $b3$, and wire $b13$. The other side of the circuit is supplied from the wire $60e$, through wire $a14'$ and $a14$, through contacts $a4$ and $b4$ and then through the wires $b14$ and $b16$ to the contact $b6$. From this point, the current is conducted from contact $b6$ to contact $a6$, through wire $a16$ to a temperature control means 65 which is exposed to, and operated by outside temperature. Under normal conditions, the current coming through wire $a16$, passes through the temperature control means and through wire *a*17 to contact *a*7. From *a*7 the current flows to *b*7 and then to the other side of the motor control 63 through wire *b*17. This is under normal conditions, and when the current is flowing through wire *b*17, then the motor 64 is operating at a low speed; or at its highest efficiency. Of course, should the temperature within the area to be conditioned drop, the thermostat 60, within the area would break the circuit to the relay and stop the motor.

Should the temperature outside rise, then the outside temperature control means 65 is operated and the current coming through the wire *a*16 does not pass through the wire *a*17 but goes through the wire *a*18, through contacts *a*8 and *b*8, and through the wire *b*18 to the motor control 63. When the current is supplied to the control in this way, the motor 64 is operated at a high speed, whereby the capacity of the condensing unit is increased. It is pointed out that when operated at a high speed, the efficiency of the motor is slightly sacrificed but since abnormal conditions are unusual, it is only for a short length of time, approximately 20% of the operating time of the motor. It is obvious that the inside thermostat 60 controls the operation of the motor with relation to the temperature of the conditioned area while the outside temperature control means 65 controls the high and low speeds of the condensing unit motor 64, whereby under normal conditions the motor operates at its maximum efficiency, while under abnormal conditions, its capacity is increased at a sacrifice of efficiency. A high and low pressure cut-out 66 is electrically connected by wires 66*a* and 66*b* with the motor control 63. This cut-out is positioned at any desired point in the refrigerant line and should the pressure rise or fall below a predetermined point said cut-out will automatically cut off the motor 64 and stop the operation of the condensing unit. This is a safety device and prevents damage to the condensing unit due to low or excessive pressure.

From the above, it is obvious that the inside thermostat 67 positively controls the condensing unit during summer operation.

For maintaining a temperature differential between the outside temperature and the temperature of the area to be conditioned, a differential thermostat 67 is connected in series with the wire *b*11 leading from said thermostat to the contact *b*1. This thermostat has an element exposed to the temperature of the conditioned area and a second element 67' exposed to the temperature of the outside area. The device may be set to maintain a differential between the inside and outside and since it is directly connected to the inside thermostat 60, it is obvious that should the outside temperature rise, the inside temperature is also permitted to rise regardless of the setting of the thermostat 60. This differential makes for maximum comfort throughout the summer months, and since the action is automatically controlled by the outside temperature, no adjustments are necessary.

As has been explained, the condensing unit is operated when the switch A is thrown to the left in Fig. 9. This causes circulation of the refrigerant through the air conditioning unit, and it is necessary to start the blower 11 at the same time, to circulate the air through the area to be conditioned. For this purpose, the wire 60*e* is connected to a lead wire 60*g* which leads directly to one side of the blower motor 23. The other side of the blower circuit is fed from the wire 60*d*, through the wire 60*f*, through the wire *a*15 which taps into the wire 60*f*, and then to the contact *a*5. From this contact the current passes through the switch A to contact *b*5, through wire *b*15 to the other side of the blower 11. Thus, it will be seen that when the switch A is thrown to the left, (Fig. 9) the blower 11 is started simultaneously with the condensing unit, whereby air is forced upwardly through the conditioning unit 10 past the cooling coils 29. If the switch B is closed, and engaging the contact C, this side of the blower circuit will be fed through a lead wire 60*h* which directly connects the wire 60*f* with the wire *b*15, whereby the current by-passes the switch A and starts the blower 11, regardless of the position of the switch.

From the above, it is obvious that during the summer operation, the inside thermostat 60 controls the condensing unit motor 64 as well as the blower 11 (provided switch B is open). The outside temperature control means 65 controls the two speeds of the motor 64 when an unusual or abnormal condition, occurs while the differential thermostat 67 maintains a temperature differential between the outside and the conditioned area, regardless of the variation in outside temperature. Should the temperature within the area drop below the point at which the thermostat 60 is set, said thermostat will automatically cut off the current to the relay 61, whereby the entire unit is stopped, thereby conserving power. Of course, as soon as the temperature rises, the thermostat will again operate to start the unit. With the arrangement above explained, it is possible to automatically meet all conditions during the summer, whereby maximum comfort to occupants of the conditioned area is obtained.

For winter operation, the master switch A is thrown to the right (Fig. 9) thereby engaging the contacts *a*1, *a*2, *a*3, *a*4, *a*5, *a*6, *a*7 and *a*8 with the contacts *c*1, *c*2, *c*3, *c*4, *c*5, *c*6, *c*7 and *c*8 respectively. The inside thermostat 60 is still the controlling element. The electrical circuit to the relay 61 is completed through the wire *b*12, contacts *b*2, *c*1 and *a*1 and wire *a*—11, whereby the relay is operated to connect the lead-in supply wire 60*e* with the wire *a*14'. The current passes through these wires to the wire *a*14 to the contact *a*4. Since the switch is thrown to the right the current passes through said switch to the contact *c*4, and through the wire *c*14 to one side of a transformer 69. The other side of the transformer is fed from the other supply wire 60*d*, the current traveling from this wire, through the wire 60*f*, and wire *a*13 to contact *a*3. From this contact the current flows through the switch A to contact *c*3 and is conducted to the other side of the transformer through the wire *c*13. The transformer serves to reduce the voltage of the electrical current, which then passes through wires 49*a* to the magnetic valve 49 which is connected in the gas supply line 48 for supplying the heating unit 34. Thus, it is seen that no gas can be admitted to the unit unless the thermostat 60 has operated the relay 61 to permit electrical current to operate the magnetic valve 49. However, a predetermined temperature may be maintained in the heating unit 34 during the winter operation, independent of the thermostat 60.

The engagement of the contact *a*5 with the contact c5 connects the wire a15 which leads from the wire a14', with the wire c15 which connects to one side of hygrostat 51 which is positioned in the area to be conditioned. The other side of the hygrostat is electrically connected by a wire 51a with the other lead in supply wire 60e. The magnetic valve 50 which is mounted in the water supply line 35' and controls the admittance of water in to the air within the conditioning unit 10, is connected in the wire 51a, whereby the hygrostat controls the operation of this valve only when the blower is in operation. It is obvious that when the humidity of the room falls, the hygrostat will be operated to automatically open the valve 50, whereby water is sprayed into the air passing upwardly through the unit 10, the hygrostat actuates the valve only when the blower is in operation.

It is necessary to first heat the water in the heating unit 34 whereby the circulation of this water through the heating coils within the conditioning unit will heat the air passing upwardly through the unit, before the blower 11 is started. Otherwise, cold air would be circulated through the area to be conditioned. For this purpose, I mount a furnacestat 71 of a conventional type, on the front wall of the cabinet and this furnacestat has its control element projecting within the air conditioning cabinet. When the air within said cabinet reaches a predetermined temperature, the furnacestat will close an electrical circuit to start the blower as will be hereinafter explained.

One side of the blower is electrically connected to the lead in supply wire 60e by the wire 60g. Current is conducted from the other supply wire 60d, through wire 60f and through a lead wire 60i, which is tapped into the wire 60f, to the wire b15' which connects to the other side of the blower. The furnacestat 71 is connected in the wire 60i and it is obvious that the furnacestat controls the completion of the circuit to the blower during the winter operation.

For operating the water pump 33 used in the circulation of the hot water through the heating coils 30, one side of said pump is directly connected to the wire 60f which leads from the supply wire 60d. The other side of the motor is supplied from transformer wire c14, and through the wire a14'. An aquastat 72' of the usual type is electrically connected in the wire a14'. This aquastat has its element exposed to the temperature of the hot water being circulated, so that when said temperature of the water rises to a sufficient point to cause its own circulation through the coils 30, then this aquastat 72' breaks the electrical circuit to stop the pump, thereby conserving power. When the temperature of the water lowers, the aquastat automatically closes the circuit and the pump again operates.

From the above, it is obvious that when the thermostat 60 operates the relay 61 (with the switch A to the right, Fig. 9) the gas is admitted to the heating unit through the valve 49, and the pump 33 started. As soon as the heating unit heats the water to a predetermined temperature, the furnacestat 71 closes the electrical circuit to the blower, starting the same. The air is forced upwardly through the unit 10 and is heated as it contacts the heating coils 30, and is then circulated through the area conditioned. Should the humidity of the area fall below a predetermined point, then the hygrostat 51 will close the circuit to the magnetic valve 50 in the water line 35', opening the same and spraying water into the heated air passing upwardly in the unit 10. The inside thermostat 60 controls the temperature of the conditioned area while the hygrostat controls the humidity in the air. All the action is entirely automatic.

For operating the unit at its highest efficiency under normal conditions and automatically speeding up the operation of the unit under abnormal conditions, a pair of aquastats 72 and 73 are provided. These aquastats are of the conventional type and have their elements exposed to the temperature of the hot water of the unit. One side of the aquastats is electrically connected by a wire 72a to the transformer, whereby said aquastats control the closing of the magnetic valve 49 in the gas line. The other side of this circuit is carried through the wire c16 which leads from the contact c6 to the transformer. The contact c6 has connection through the switch with the contact a6 and wire a16, which connects to the outside temperature control means 65.

Under normal operating conditions, the current flows through the thermostat and through the wire a17 to contact a7; then through c7 and wire c17 to the other side of the aquastat 72. Normally, this aquastat is inoperative until the water reaches a predetermined temperature, at which time it closes the valve 49 to cut off the gas. As the temperature falls, the aquastat 72 again closes the circuit to open the valve 49.

If the outside temperature which actuates the outside temperature control means 65, drops suddenly so as to bring about an abnormal condition, then the temperature control means 65 is actuated to conduct the current, flowing through the wire a16, through the wire a18 and contact a8. From this contact the current passes through contact c8 and then through wire c18 to the other side of the aquastat 73. This aquastat is set to close the magnetic valve 49 at a higher temperature of the water, whereby the water may be heated to a higher temperature and thereby increase the heating capacity of the heating unit. The aquastat 73 now controls the valve and will of course, prevent heating the water above a predetermined temperature. When the outside temperature returns to normal, the thermostat 65 operates to cut out the aquastat 73 and cut in the aquastat 72. Thus, it is seen that under abnormal conditions, the capacity of the heating unit is automatically increased until such a time as said conditions return to normal.

From the foregoing, it is obvious that a complete, automatically controlled air conditioning unit is provided. In the summer, the air is cleaned by filtering, cooled, and then circulated through the area to be conditioned. A temperature differential is maintained, and the condensing unit operates at its highest efficiency under normal conditions. Under abnormal conditions, the condensing unit operates at slight sacrifice of efficiency and maximum comfort in the conditioned area is assured even under extreme conditions. During the winter, the air is filtered, heated, humidified and circulated through the conditioned area. A comfortable temperature is maintained within the area and the heating unit, like the condensing unit is operated at its highest efficiency under normal conditions, being overloaded under abnormal conditions.

If desired, an electrical time switch may be incorporated in conjunction with the thermostat 60 or 67, whereby the entire heating unit may be automatically stopped and started according to the time of day or the cooling unit when it is in operation may be likewise controlled. During the winter, a predetermined temperature is maintained in the conditioned area throughout the day, as explained above. At any desired time in the evening the time switch mechanism changes the thermostat 60 to any desired temperature, such as 40 degrees to prevent freezing during the night. In the morning at a predetermined hour, the thermostat is reset to the usual daytime temperature. Similarly, during the summer, the time switch disconnects the refrigerating unit at the set hour in the evening, and at a predetermined hour in the morning, closes the circuit to the cooling unit, which places it in service for daytime operation.

During the spring and fall months, it has been found desirable not to employ either the heating or condensing units, but to operate only the blower 11 so as to circulate sufficient clean air through the area. For this purpose, the master switch A is swung to a neutral position where it is disengaged from the contacts b1 to b8 and contacts c1 to c8. The switch B is closed, whereby one side of the blower is supplied with current from the wire 60d, through wires 60f, 60h, and then through wires b15 and b15'. The other side of the blower is fed from the supply wire 60e, through the wire 60g. When the switch B is closed, the circuit to the blower motor is complete and since the master switch A is in a neutral position, neither the heating or condensing units are operating. Thus, the air is cleaned and circulated through the area to be conditioned and this procedure is ideal for fall and spring weather.

It is obvious that a complete year round air conditioning unit is provided. The control is entirely automatic, the only manual controls being the switches A and B. By making the condensing and heating units complete in themselves, it is possible for one to be dormant while the other is operating. It is unnecessary to pump the refrigerant from the coils 29 at the beginning of the winter months to permit the coils to be used for hot water from the heating unit, as is usually the practice. The entire unit is compact, efficient and may vary in size according to the area to be conditioned. Under normal conditions, both the heating and condensing units are operating at their highest efficiency, being forced only when the outside conditions are abnormal. The capacity of these units is increased automatically by the outside temperature control means 65 and it will be seen that with this unit maximum comfort may be obtained throughout the entire year, with a minimum expense in operating costs.

What I claim and desire to secure by Letters Patent is:

1. An air conditioning system comprising, an air conditioning unit having an air inlet, means for supplying air from said unit to an area to be air conditioned, a refrigerating unit for cooling the air as it passes through the air conditioning unit, a two speed motor for operating the refrigerating unit, automatic controlling means for operating the motor at its highest rated efficiency at a normal temperature and below its highest rated efficiency at a temperature above normal, a heating unit for heating the air as it passes through the air conditioning unit, automatic controlling means for operating said heating unit at its highest rated efficiency at a normal temperature and below its highest rated efficiency at a temperature below normal, and selective means for operating either the heating unit or the cooling unit.

2. An air conditioning system comprising, an air conditioning unit having an air inlet, means for circulating air from the unit through an area to be air conditioned, a refrigerating unit for cooling air passing through said air conditioning unit, a two speed motor for operating the refrigerating unit, automatic means controlled by the temperature in the area to be air conditioned for effecting the operation of said motor and automatic control means responsive to the temperature outside of the area to be conditioned for causing the operation of the motor at its normal speed at a normal temperature and at an abnormal speed at a temperature above normal.

3. An air conditioning system comprising, an air conditioning unit having an air inlet, means for circulating the air from the unit to an area to be conditioned, a refrigerating unit for cooling the air discharged from the air conditioning unit, a heating unit for heating the air discharged from the air conditioning unit, automatic control means connected with the cooling and heating units and exposed to and actuated by the temperature of air outside the area to be conditioned, automatic control means in the area to be conditioned co-acting with the outside control means to operate the cooling and heating units at their highest rated efficiency at a normal temperature and below their highest rated efficiency at a temperature above or below normal, and selective means for operating the heating and cooling units independently of each other.

4. An air conditioning system comprising, an air conditioning unit, having an air inlet, means for circulating the air from the unit to an area to be conditioned, a refrigerating unit for cooling the air discharged from the air conditioning unit, a heating unit for heating the air discharged from the air conditioning unit, automatic control means connected with the cooling and heating units and exposed to and actuated by the temperature of air outside the area to be conditioned, automatic control means in the area to be conditioned co-acting with the outside control means to operate the cooling and heating units at their highest rated efficiency at a normal temperature and below their highest rated efficiency at a temperature above or below normal, selective means for operating the heating and cooling units independently of each other, and means for operating the air circulating unit independently of both the cooling and heating units.

5. An air conditioning system comprising, an air conditioning unit, having an air inlet, means for supplying air from said unit to an area to be air conditioned, a refrigerating unit for cooling the air as it passes through the air conditioning unit, a two-speed motor for operating the refrigerating unit, automatic controlling means for operating the motor at its highest rated efficiency at a normal temperature and below its highest rated efficiency at a temperature above normal, a heating unit for heating the air as it passes through the air conditioning unit, automatic controlling means for operating said heating unit at its highest rated efficiency at a normal temperature and below its highest rated efficiency at a temperature below normal, selective means for operating either the heating unit or the cooling unit, and means actuated by the temperature outside the area for maintaining a temperature differential between said outside area and the area to be conditioned when the cooling unit is operating.

6. An air conditioning system comprising, an air conditioning unit having an air inlet, means for circulating the air from the unit to an area to be conditioned, a refrigerating unit for cooling the air discharged from the air conditioning unit, a heating unit for heating the air discharged from the air conditioning unit, automatic control means connected with the cooling and heating units and exposed to and actuated by the temperature of air outside the area to be conditioned, automatic control means in the area to be conditioned co-acting with the outside control means to operate the cooling and heating units at their highest efficiency at a normal temperature and below their highest rated efficiency at a temperature above or below normal, selective means for operating the heating and cooling units independently of each other, and means actuated by the temperature outside the area to be conditioned and connected with the automatic control means for the cooling unit for maintaining a temperature differential between said outside area and the area to be conditioned.

7. An air conditioning system comprising, means for supplying air to an area to be air-conditioned, means for cooling air as it is supplied, means for heating air as it is supplied, a master control switch for selectively setting either the cooling means or heating means in operation, means actuated by the temperature of air outside the area to be conditioned for operating the cooling unit at its highest rated efficiency at a normal or average temperature and below its highest rated efficiency at a temperature higher than average when the master switch has been actuated to operate the cooling unit, said last named means arranged to operate the heating unit at its highest rated efficiency at a normal or average temperature and below its highest rated efficiency at a temperature lower than average when the switch has been actuated to operate the heating unit, and automatic means within the area to be conditioned co-acting with the outside means for maintaining a desired temperature within the conditioned area.

8. An air conditioning system comprising, means for supplying air to an area to be air-conditioned, means for cooling air as it is supplied, means for heating air as it is supplied, a master control switch for selectively setting either the cooling means or heating means in operation, means actuated by the temperature of air outside the area to be conditioned for operating the cooling unit at its highest rated efficiency at a normal or average temperature and below its highest rated efficiency at a temperature higher than average when the master switch has been actuated to operate the cooling unit, said last named means arranged to operate the heating unit at its highest rated efficiency at a normal or average temperature and below its highest rated efficiency at a temperature lower than average when the switch has been actuated to operate the heating unit, automatic means within the area to be conditioned co-acting with the outside means for maintaining a desired temperature within the conditioned area, and means actuated by the temperature outside the conditioned area and connected with the automatic means for maintaining a temperature differential between the outside and the conditioned area.

9. An air conditioning system including, means for circulating air through the space to be air conditioned, means for cooling the air circulated, means for heating the air circulated, manually operated means for selecting either the air cooling means or the air heating means to be operated, a thermostat in the space to be conditioned for controlling the operation of either the air cooling means or the air heating means, means associated with said manually operated means for connecting said thermostat with the air conditioning means selected to be operated, and a differential thermostat also associated with the air cooling means and the aforesaid thermostat operable to differentially fix the temperature to which the air in the space to be air conditioned is to be maintained with respect to the temperature of the air outside thereof.

10. An air conditioning system including, means for circulating air through the space to be air conditioned, means for cooling the air circulated, means for heating the air circulated, manually operated means for selecting either the air cooling means or the air heating means to be operated, a thermostat in the space to be conditioned for controlling the operation of either the air cooling means or the air heating means, means associated with said manually operated means for connecting said thermostat with the air conditioning means selected to be operated, and a thermal control means responsive to temperatures either above normal high temperatures or below normal cold temperatures on the outside of the space to be air conditioned to effect an increased operation of the air conditioning means selected to be operated.

11. An air conditioning system comprising, an air conditioning unit, means for supplying air to the unit, means for supplying air from said unit to an area to be conditioned, a refrigerating unit for cooling air passing through said air conditioning unit, means for operating the refrigerating unit including a two speed motor for driving it, a thermostat in the area to be conditioned for effecting the operation of said refrigerating unit by said motor, and thermal control means responsive to the temperature outside the area to be conditioned operable to select the speed at which said motor is to be operated.

12. In an air conditioning system, an air conditioning unit comprising a casing having an inlet at one end and an outlet at the other end, an air supply conduit leading to the casing inlet, a conduit leading from the casing outlet to the space to be air conditioned, means for forcibly passing air through said casing and through the conduits into the space to be conditioned, heat exchange coils in said casing arranged across the path of the air passing therethrough for transferring heat thereto, a boiler, supply and return conduits connecting said boiler and said heat exchange coils providing a circulating system to, through and from the boiler, a water circulator in said boiler circulating system providing a forced circulation of the boiler heated fluid, means for heating the boiler, means for operating the boiler in accordance with required boiler temperature, means for normally operating the water circulator in response to temperature conditions of the space to be air conditioned, and outside temperature controlled means for effecting abnormal operation of boiler and water circulating system at increased capacity when the outside temperature falls below that at which the boiler and water circulating system is operable at normal capacity.

13. In an air conditioning system, an air conditioning unit comprising a casing having an inlet and an outlet, an air supply conduit leading to the casing inlet, a conduit leading from the casing outlet to the space to be air conditioned, means for passing air through said casing and the conduit to the space to be conditioned, attemperating means comprising heat exchange elements in said casing arranged across the path of the air passing therethrough for transferring heat thereto, a heater of a given capacity and greatest efficiency when operating under normal conditions, means for operating the heater in accordance with required temperature in the space being conditioned, and outside temperature controlled means for effecting abnormal operation of the attemperating means at increased capacity when the outside temperature falls below that at which the attemperating means is operated at normal capacity.

14. In an air conditioning system, an air conditioning unit comprising a casing having an inlet and an outlet, an air supply conduit leading to the casing inlet, a conduit leading from the casing outlet to the space to be air conditioned, means for passing air through said casing and the conduit to the space to be conditioned, heat exchange elements in said casing arranged across the path of the air passing therethrough for transferring heat thereto, a heater of a given capacity and greatest efficiency when operating under normal conditions, supply and return conduits connecting said heater and said heat exchange elements, providing a circulating system between and through the heater and the heat exchange elements, means for operating the heater in accordance with required temperature in the space being conditioned, and outside temperature controlled means for effecting abnormal operation of the heater and the heat exchange elements at increased capacity when the temperature falls below that at which the heater and heat exchange elements are operated at normal capacity.

THOMAS W. CARRAWAY.